United States Patent [19]
Hartal et al.

[11] Patent Number: 5,965,183
[45] Date of Patent: Oct. 12, 1999

[54] STABLE LYCOPENE CONCENTRATES AND PROCESS FOR THEIR PREPARATION

[76] Inventors: Dov Hartal, 6 Ugarit Street, Tele Aviv 69016, Israel; Yigal Raveh, 24 Haim Laskov Street, Haifa 34950, Israel; Abraham Wolf, 66 Borochov Street, Kiryat Ata 28000, Israel

[21] Appl. No.: 08/817,889
[22] PCT Filed: Oct. 31, 1995
[86] PCT No.: PCT/US95/14475
§ 371 Date: Apr. 30, 1997
§ 102(e) Date: Apr. 30, 1997
[87] PCT Pub. No.: WO96/13178
PCT Pub. Date: May 9, 1996

[30] Foreign Application Priority Data

Oct. 31, 1994 [IL] Israel ......................................... 111477

[51] Int. Cl.⁶ ..................................................... A23L 1/275
[52] U.S. Cl. .......................... 426/250; 426/540; 426/651; 426/478
[58] Field of Search ..................................... 426/250, 262, 426/270, 302, 540, 481, 478, 651, 489

[56] References Cited

U.S. PATENT DOCUMENTS

| | | | |
|---|---|---|---|
| 3,998,753 | 12/1976 | Antoshkiw et al. | 252/212 |
| 4,343,823 | 8/1982 | Todd et al. | 426/250 |
| 4,726,955 | 2/1988 | Horn et al. | 426/73 |
| 5,350,773 | 9/1994 | Schweikert et al. | 514/763 |

FOREIGN PATENT DOCUMENTS

| | | |
|---|---|---|
| 0239949 | 10/1987 | European Pat. Off. . |
| 0551638 | 7/1993 | European Pat. Off. . |
| 0608027 | 7/1994 | European Pat. Off. . |
| 6608027 A3 | 7/1994 | European Pat. Off. . |

OTHER PUBLICATIONS

International Food Ingredients 6,45–51 (1993), Nir,Z. et al "Lycopene from Tomatoes . . . ".

*Primary Examiner*—Milton Cano
*Attorney, Agent, or Firm*—Michael N. Meller

[57] ABSTRACT

A process for a preparing stable lycopene concentrate in an essentially non-dissolving liquid and uses thereof is described.

32 Claims, No Drawings

STABLE LYCOPENE CONCENTRATES AND PROCESS FOR THEIR PREPARATION

FIELD OF THE INVENTION

The present invention relates to the food, pharmaceutical and cosmetic industries. More particularly, the invention relates to stable lycopene concentrates which are suitable for use in food coloring, nutraceuticals, pharmaceutical and cosmetic formulations. The invention further relates to processes for the preparation of the formulations.

BACKGROUND OF THE INVENTION

Lycopene has been recently recognized as an industrially important natural food coloring agent, because of its high staining power in the red region, and because of its safety and potentially beneficial effect. Lycopene occurs naturally and abunds in a number of fruits, primarily in tomatoes and watermelon, from which it can be extracted by different extraction processes. Lycopene can also be synthesized by a variety of synthetic routes, both chemically and biosynthetically. While reference will be made hereinafter to tomatoes as the source of lycopene, for the sake of brevity, it is understood that the same applies, *mutatis mutandis*, to watermelon or to any other lycopene source, including synthetic lycopene.

The art recognizes the use of vegetable extracts as colorants and additives to the food industry. Spice and herbs oleoresins, for instance, are commonly employed in the food industry. For instance, U.S. Pat. No. 4,285,981 refers to the use of oleoresins as food colorants or flavoring. U.S. Pat. No. 5,019,405 teaches the use of natural colorants for the dyeing of fruit.

A number of processes have been proposed and are currently used for the extraction of oleoresins, such as paprika oleoresin, e.g., by using hexane as the extraction solvent. According to a process described in copending Israeli Patent Application No. 107999, filed Dec. 23, 1993 by the same applicants herein, the pulp obtained after the separation of waste materials and of tomato serum is fed to an extraction stage, where it is extracted to provide tomato oleoresin. Such oleoresin contains about 2–10% of lycopene, depending on the original concentration of lycopene in the tomato. Tomato oleoresin containing about 40%–100% lycopene is obtained in the form of a free-flowing powder.

The use of lycopene presents some technological and practical problems. First of all, pure crystalline lycopene is unstable on storage at room temperature, due to oxidation, and lycopene may undergo degradation with time, unless appropriate measures are taken, e.g. antioxidants are added. While food-compatible antioxidants are known and used in industry, e.g., BHT, BHA or propyl gallate, they are not a desirable addition, and they are dispensed with whenever possible. In addition, lycopene-containing formulations should be protected against microbial spoilage. Lycopene which naturally occurs in oleoresins apparently enjoys the protection of the oil and of natural antioxidants (tocopherols), originating from the tomato, but when it is dispersed in an environment. such as water, which can support microbial growth, the formulation will spoil unless it is protected by suitable means, such as by heat sterilization or the addition of preservatives. Illustrative examples of such preservatives are benzoic acid and sorbic acid.

Although lycopene exists in different forms, having different colors and intensities, the term "lycopene" is used in all cases to indicate the chemical entity. It should be noted however, that crystalline lycopene has an intense red color, and differs from dissolved or dispersed or solubilized lycopene, which has a yellow-orange color. Furthermore, lycopene naturally occurring in fruit is found in chromoplasts in crystalline form, and therefore is capable of retaining its red color, as in the tomato. Therefore, throughout this specification it is important to note to what form of lycopene reference is being made at the various stages of the process described herein.

As stated, the intense red color of lycopene is due to its crystalline form, and is influenced by its particle size distribution. Lycopene loses its staining power in the red range when the crystals dissolve, which occurs readily in a variety of organic solvents, e.g., oils, including oil found in the tomato seeds and extracted during the processing of the tomato in the course of lycopene oleoresin production. When lycopene oleoresin is solubilized in aqueous solutions, it assumes a yellowish to orange color, depending on concentration, and cannot be used to impart red color to food products.

Additionally, lycopene crystals recovered from oleoresin extraction, as described above, vary greatly in size, and contains relatively large crystals, of the order of tens of microns. Given that optimal staining power in the red color range is obtained in the 1 $\mu$m to 3 $\mu$m particle diameter range, in terms of light refracted from the crystals much staining power is lost if the oleoresin is used as such, as is customarily done in the art. Furthermore, one cannot effectively use the oleoresin as such, to obtain red color, since part of the lycopene is dissolved in the tomato lipids and the resulting hue will be orange.

It is therefore clear that it would be highly desirable to provide a lycopene concentrate that overcomes the aforesaid drawbacks while maintaining a high staining power.

SUMMARY OF THE INVENTION

It has now been filed, and this is an object of the invention, that it is possible to provide stable lycopene compositions which have a high staining power in the red range, and which can be stored at room temperature for a long period of time.

It is an object of the invention to provide such lycopene compositions, which are food compatible.

It is another object of the invention to provide lycopene concentrates which can be used with cosmetic preparations.

It is yet another object of the invention to provide lycopene concentrates which can be used with pharmaceutical preparations.

It is a further object of the invention to provide lycopene concentrates which can be used in nutraceuticals.

It is still another object of the invention to provide lycopene concentrates which do not contain added antioxidants, and yet are stable towards oxidation.

It is a further object of the invention to provide a lycopene concentrate which is protected against microbial spoilage or enzymatic attack, without the need to use preservatives.

It is another object of the invention to provide a process for the preparation of stable lycopene concentrates, from lycopene crystals.

It is a further object of the invention to provide a process for obtaining oleoresin fractions enriched with lycopene crystals from oleoresins (e.g., tomato or watermelon), which crystals can be directly used for the preparation of the stable coloring compositions.

It is yet another object of the invention to provide stable compositions containing lycopene together with one or more additional carotenoids, such as β-carotene.

Still another object of the invention is to provide such stable compositions based on synthetic lycopene.

Other objects of the invention will become apparent as the description proceeds.

DETAILED DESCRIPTION OF THE INVENTION

The process for the preparation of stable lycopene concentrates, according to the invention, comprises size-reducing lycopene crystals in a food-compatible liquid medium which essentially does not dissolve lycopene. Suitable size-reducing techniques, such as wet grinding, which is a convenient technique for the purposes of the invention, will be recognized by the skilled person, and are therefore not discussed herein in detail, for the sake of brevity. While suitable food-compatible liquids will be easily recognized by the skilled person, illustrative and non-limitative examples thereof include glycerol, propylene glycol and ethanol, which are recognized food-grade liquids, or their mixtures. The lycopene concentrate so obtained is dually stable: it is protected both against oxidation and against microbial spoilage, because the food-compatible liquid can be chosen to have an activity against microorganisms, including antimicrobial activity as well as activity against yeast, fungi, etc., as for example glycerol, propylene glycol and ethanol. However, it should be understood that even if a less antimicrobially-effective liquid is used—or even a liquid which permits microbial growth, such as water—which requires the addition of antimicrobial agents, this still retains many of the advantages of the invention, and does not exceed its scope.

Glycerol is the most preferred liquid for the purposes of the invention, for practical reasons. Glycerol is GRAS (Generally Recognized as Safe), according to the US FDA, and is an all-purpose food additive. Furthermore glycerol is available both from natural and synthetic sources, and therefore can be used for purposes requiring natural ingredients only, such as health foods (nutraceuticals). A further substantial advantage of glycerol is that it is bacteriostatic, and therefore lycopene compositions provided in a liquid which is essentially glycerol do not require the addition of preservatives. While the invention can be exploited also with liquids which require the addition of food preservatives, and is not intended to be limited in any way to formulations which are free from such preservatives, it is apparent that the ability to avoid the addition of food preservatives is advantageous, and therefore liquids such as polyols, e.g. glycerol or propylene glycol are the most preferred. Also suitable are primary and secondary alcohols, such as ethanol or propanol, and their mixtures with polyols. Nevertheless, for many practical industrial applications it may be convenient to carry out the process, including the size-reducing of lycopene crystals, in a solution which is essentially aqueous, depending on the specific use and the required storage time, this may or may not require preservation techniques such as the addition of antimicrobial agents. All such formulations are encompassed by the present invention.

It has further been surprisingly found that the compositions of the invention, based on glycerol, are protected from oxidation. Without wishing to be bound by any particular theory, the inventors believe that this may be due to an inhibition of oxygen contact with the crystals. In any case, and regardless of the reasons for this result, the high stability towards oxidation is an important advantage of the invention.

Another substantial advantage of glycerol is that it is water miscible. The use of a water soluble or water miscible liquid to disperse the lycopene crystals is advantageous, since it allows a homogeneous distribution of the lycopene in the food to which it is added. Most food products of red colors to which lycopene is added as a colorant are water based since, as said, oily products dissolve the lycopene which as a result loses its staining power in the red region. Glycerol, as well as other preferred liquids, such as those mentioned herein, in contrast, dissolves well in water and the released lycopene particles disperse uniformly in the water-based product, resulting in a red color.

In this specification, the terms "formulation", "concentrate" and "composition" are used interchangeably, and should be interpreted in the context of the description given.

In order to obtain a high staining power it is preferred that the lycopene crystals be ground to an average particle size of below about 5 μm. Typically an average particle size of about 1–3 μm is convenient for most uses. The shape of the crystals is also of importance, as described in "*Interfacial Phenomena in Apolar Media, Dispersions of Dye in Apolar Media*", H. F. Eicke and G. D. Parfitt (eds.), Vol. 21 in *Surfactant Science Series,* marcel Dekker, NY, 1986. Therefore it is desirable to pay attention to the size-reducing equipment employed, to ensure optimal results.

Furthermore, prevention of agglomeration and clamping is also of importance. For this purpose, it may be desirable to add suitable dispersants, such as lecitin. Other suitable dispersants will be easily recognized by the skilled person.

In one aspect, therefore, the invention is directed to stable lycopene formulations comprising lycopene crystals suspended in a liquid which essentially does not dissolve lycopene. Depending on the use for which the concentrate is intended, the liquid in which the lycopene crystals are suspended may be a food-compatible or a cosmetically-acceptable or a pharmaceutically-acceptable liquid.

As will be appreciated by the skilled person, when the concentrated stable compositions described above are dissolved in an aqueous medium, in order to prepare food products, appropriate additives must often be added, such as weighing agents, dispersants, or other materials, e.g., to avoid sedimentation of the lycopene crystals which would result in a loss of color to the product. Of course, the specific agents used differ very much from one product to another and should be taylor-made in each case, and furthermore such agents are well known to the skilled person and, therefore, are not discussed herein.

In another aspect the invention is directed to a process for the preparation of a crystalline lycopene composition, which process comprises treating a lycopene-containing oleoresin with a solvent or solvent mixture which dissolves the lipid phase of the oleoresin and which does not substantially dissolve lycopene, to remove therefrom a major part of the oleoresin lipids. A minor part of the lipids, however, can remain in the final material and could even be sometime beneficial, e.g., to the stability of the lycopene crystals. Of course, the addition of lipids, either as a make-up or to crystals which do not contain them, is also contamplated as a part of the invention, whenever desired or beneficial.

As stated, the oleoresin which is used as the raw material can be of any suitable source, e.g. the oleoresin can be a tomato or watermelon oleoresin.

Among the solvent mixtures suitable for use with the invention one mixture provides outstanding results. The said solvent mixture is an acetone/ethyl acetate mixture. Other suitable mixtures will be recognized by the skilled person and include, e.g., hexane/acetone and ethyl acetate/ethanol. Generally, the solvents must be adapted to the intended use of the final product and therefore must be food grade, or pharmaceutical grade or cosmetic grade, depending on the requirements from the final product.

While there is no particular temperature which should be employed in the process of the invention, it is clear to the skilled person that too high temperatures will cause a deterioration of the lycopene (e.g., isomerization or degradation) and, therefore, are not desirable. On the other hand, too low temperatures will require long contact times of the oleoresin with the solvent mixture. Accordingly, it is normally preferred to keep the oleoresin in contact with the solvent mixture at a temperature above about 10° C., typically at a temperature of about 50° C. The temperature is also of importance because it affects the selective solubility and, therefore, the separation of oleoresin lipids. At high temperatures lycopene will dissolve in the solvent and the losses to the process will be high.

The contact times and solvent volumes employed are, of course, influenced by the lycopene content in the raw lycopene oleoresin, and the skilled engineer will easily appreciate the changes in process parameters needed to accommodate changes in raw material contents. In most cases, however, when a tomato oleoresin is used, the raw oleoresin contains about 8–10% lycopene, and the volumetric ratio between the oleoresin and the solvent mixture is conveniently between 1:10 and 1:2.

The ratio between the solvents in the solvent mixture is also a parameter that needs consideration. Optimal ratios for a given desired product can be easily determined by the skilled person, by simple methods and without undue experimentation. According to a preferred embodiment of the invention, when acetone and ethyl acetate are used as the components of the solvent mixture, the ratio between acetone and ethyl acetate in the solvent mixture is about 2:3 (v/v).

Accordingly, the invention also encompasses a process comprising contacting crude lycopene-containing oleoresin with an acetone/ethyl acetate solvent mixture for a period of time and at a temperature sufficient to dissolve a substantial part of the lipid fraction in the solvent mixture, filtering the mixture to remove the fraction poor in lycopene, thereby leaving an enriched lycopene fraction, rinsing the enriched lycopene fraction with hot acetone to remove the acetone soluble materials thereby leaving a fraction rich in lycopene crystals. As stated, a convenient temperature at which the process is carried out in all stages, is about 50° C. The number of rinsings carried out with acetone is also a parameter that influences the purity of the lycopene crystals.

As explained, the amount of solvent employed affects the nature of the final product. For instance, if a 1:10 (v/v) oleoresin/solvent mixture ratio is employed, a fraction containing more than 90 weight % lycopene is obtained. On the other hand, if a 1:3 (v/v) oleoresin/solvent mixture ratio is employed, and a fraction containing more than 70 weight % lycopene is obtained. This latter fraction is, of course, less rich in lycopene, but is obtained in higher yields, with less loss of lycopene. Therefore, depending on various parameters and engineering considerations, it is possible to obtain different lycopene concentrations in the final fraction.

In another aspect, the invention is directed to a process for the preparation of a stable lycopene concentrate, comprising the steps of:

a) contacting crude lycopene-containing oleoresin with an acetone/ethyl acetate solvent mixture for a period of time and at a temperature sufficient to dissolve a substantial part of the lipid fraction in the solvent mixture;

b) separating the mixture to remove a substantial part of the tomato lipids, thereby leaving an enriched lycopene fraction;

c) rinsing the enriched lycopene fraction with hot acetone to remove the acetone soluble materials thereby leaving, after filtration as required, a fraction rich in lycopene crystals;

d) dispersing the enriched lycopene fraction so obtained in a food-compatible liquid which essentially does not dissolve lycopene; and e) size-reducing the lycopene crystals in the said food-compatible liquid.

Separation of the mixture can be effected by any suitable equipment, e.g., by filtering, decanting or centrifuging. Likewise, grinding can also be effected using a variety of apparatus. According to a preferred embodiment of the invention, however, grinding is a wet grinding and suitable grinding apparatus is used.

Of course, the mixture should be stirred as needed, during contact time, to enhance mass transfer processes.

The food-compatible liquid is as described above, and is typically selected from the group consisting essentially of glycerol, propylene glycol and ethanol, or their mixtures, or mixtures thereof with other food-compatible liquids.

In a further aspect, the invention is directed to the use of a stable lycopene concentrate comprising lycopene crystals suspended in a food-compatible liquid, as a food colorant or food additive.

In another aspect, the invention is directed to the use of a stable lycopene formulation comprising lycopene crystals suspended in a pharmaceutically-acceptable liquid, as a medicament or additive to a medicament.

In yet another aspect, the invention is directed to the use of a stable lycopene formulation comprising lycopene crystals suspended in a cosmetically-acceptable liquid, as an additive to cosmetic preparations.

The invention is also directed to the use of a stable lycopene formulation comprising lycopene crystals suspended in a food-compatible liquid, as a nutraceutical product or component.

The invention also encompasses formulations based on synthetic lycopene, as well as the process for preparing stable formulations of the invention by dispersing synthetic lycopene (typically, but non limitatively, 95% pure or higher) in a suitable liquid medium, and size-reducing it, if and as needed, in the said medium. Also encompassed by the invention are mixtures of lycopene with other carotenoids, such as β-carotene, whether their sources are natural or synthetic.

All the above description and advantages of the invention will be better understood through the following illustrative and non-limitative examples. Unless otherwise indicated, percentages given herein are by weight.

EXAMPLE 1

Preparation of Lycopene Crystals from Oleoresin

100 Kg of tomato containing 100 ppm lycopene were processed as described hereinafter. After washing, crushing and waste separation, 99.5 Kg of processable material remained. The material was fed to a centrifuge and separated into two streams: tomato pulp (9 Kg) and tomato serum (90.5 Kg).

The 9 Kg of tomato pulp were extracted twice with 25 Kg of warm (50° C.) ethyl acetate. After evaporation of the solvent 250 gr of tomato oleoresin were obtained, which contained about 5% lycopene.

1 Part of the oleoresin obtained above was mixed with 10 parts of a 2:3 acetone/ethyl acetate solvent mixture, and the mixture was heated to 50° C. and kept at that temperature for 10 minutes while stirring. Next, the mixture was vacuum filtered at 50° C. with a water jet pump vacuum, to yield a crude lycopene fraction. The resulting material was washed three times with hot (50° C.) acetone 3×3 parts and the resulting fraction contained over 90% crystalline lycopene, in crystalline form. The crystalline fraction was vacuum dried to remove trace solvent.

The mean crystal size was 15–120 µm.

The operations described above were repeated with different solvent mixtures, to give the results shown in Table I below.

| EtAc:Acetone Ratio | Solvent:Oleoresin Ratio | Final Lycopene Concentration | Yield |
|---|---|---|---|
| 2:3 | 1:5 | 83.7 Wt % | 72.2 |
| 1:1 | 1:5 | 88.3 Wt % | 76.18 |
| 3:2 | 1:5 | 90.0 Wt % | 62.9 |
| 3:2 | 1:10 | 99.0 Wt % | 73.4 |

EXAMPLE 2

Preparation of Stable Lycopene Concentrate

The lycopene crystals obtained in Example 1 were suspended in glycerol, to give a 1%–3.2% by weight lycopene concentrate. The suspension was fed to a Pearl Mill, Dispermate SL-501(VMA Getzmen Germany), and the crystals were size reduced to an average size of 1–3 µm.

Ten samples of each of the formulations so obtained were put in 20 ml flasks, which were kept at room temperature and examined monthly by spectrophotometric methods, to determine lycopene concentration and stability to microbial attack. No deterioration could be detected after six months of stability test. Tests carried out using propylene glycol and ethanol, as well as mixtures thereof, gave comparable results.

The formulations were also used as coloring additives to water-based beverages, ice cream, baked cakes and tomato soup, and in all cases they retained their staining power and high dispersability in the food product.

EXAMPLE 3

Preparation of 70% Lycopene Crystals from Oleoresin

Example 1 was repeated, but with the following changes: 1) The volumetric ratio between the tomato oleoresin and the solvent mixture was (1:3.2). The enriched lycopene fraction was rinsed only once with hot acetone.

The crude lycopene crystals were obtained were 70% purity, and were still free flowing and easy to handle.

All the above description and examples have been provided for the purpose of illustration, and are not intended to limit the invention in any way. Many modifications can be effected in the processes and formulations of the invention. For instance, different liquids can be used to disperse the lycopene crystals, and different solvent mixtures and temperatures can be employed to provide the crystal rich fractions. Furthermore, various lycopene and other carotenoid sources, natural and synthetic, oleoresin production processes and crystal sizes can be used, all without exceeding the scope of the invention.

We claim:

1. A process for the preparation of a stable lycopene concentrate which comprises placing lycopene crystals in a liquid medium which does not substantially dissolve lycopene; and grinding the lycopene crystals to an average particle size of below about 5 µm.

2. A process according to claim 1, wherein the liquid medium is selected from the group consisting of glycerol, propylene glycol, ethanol, water, a water soluble liquid, a water miscible liquid, or mixtures thereof.

3. A process according to claim 2, wherein the lycopene crystals are ground to an average particle size of about 1–3 µm.

4. A process according to claim 1 wherein the lycopene crystals are ground to an average particle size of about 1–3 µm.

5. A process according to claim 1 wherein the liquid medium further comprises antioxidant, a preservative or a combination thereof.

6. A stable lycopene concentrate comprising lycopene crystals suspended in a food compatible or cosmetically or pharmaceutically acceptable liquid which does not substantially dissolve lycopene, wherein the lycopene crystals have an average particle size below about 5 µm.

7. A concentrate according to claim 6, wherein the liquid in which the lycopene crystals are suspended is a food-compatible or cosmetically- or pharmaceutically-acceptable liquid.

8. A concentrate according to claim 6, wherein the liquid is selected from the group consisting of glycerol, propylene glycol, ethanol, water or water soluble or water miscible liquid or mixtures thereof.

9. A concentrate according to claim 8, wherein the lycopene crystals have an average particle size of about 1–3 µm.

10. A concentrate according to claim 9, wherein the lycopene crystals have an average particle size of about 1–3 µm.

11. A concentrate according to claim 8 wherein the liquid medium further comprises an antioxidant, a preservative and mixtures thereof.

12. A concentrate according to claim 6, further composing one or more additional carotenoids.

13. A concentrate according to claim 12, wherein the additional carotenoids comprise β-carotene.

14. A process for the preparation of a crystalline lycopene composition, comprising mixing a lycopene-containing oleoresin with a solvent or solvent mixture which dissolves the lipid phase of the oleoresin and which does not substantially dissolve lycopene crystals, to remove therefrom a major part of the oleoresin lipids.

15. A process according to claim 14, wherein the oleoresin is a tomato or watermelon oleoresin.

16. A process according to claim 14, wherein the solvent mixture is an acetone/ethyl acetate mixture.

17. A process according to claim 16, wherein the oleoresin contains about 2–10% lycopene, and the volumetric ratio between the oleoresin and the solvent mixture is between 1:10 and 1:2.

18. A process according to claim 17, wherein the ratio between acetone and ethyl acetate in the solvent mixture is about 2:3 (v/v).

19. A process according to claim 14, wherein the oleoresin is kept in contact with the solvent mixture at a temperature of about 10° C.

20. A process according to claim 19, wherein the temperature is about 50° C.

21. A process according to claim 14, further comprising contacting crude lycopene-containing oleoresin with an acetone/ethyl acetate solvent mixture for a period of time and at a temperature sufficient to dissolve a substantial part of the lipid fraction in the solvent mixture, filtering the mixture to remove the fraction poor in lycopene, thereby leaving an enriched lycopene fraction, rinsing the enriched lycopene fraction with hot acetone to remove the acetone soluble materials thereby leaving a crude crystalline lycopene product.

22. A process according to claim 21, which is carried out in all stages at a temperature of about 50° C.

23. A process according to claim 21 wherein a 1:10 (v/v) oleoresin/solvent mixture ratio is employed, and a fraction containing more than 90 weight % crystalline lycopene is obtained.

24. A process according to claim 21 wherein a 1:3 (v/v) oleoresin/solvent mixture ratio is employed, and a reaction containing more than 70 weight % lycopene is obtained.

25. A process according to claim 14 wherein the solvent is selected from the group consisting of ethanol, ethyl acetate, hexane, acetone, isopropanol and mixtures thereof.

26. A process for the preparation of a stable lycopene concentrate, comprising the steps of:
   a) contacting crude lycopene-containing oleoresin with an acetone/ethyl acetate solvent mixture for a period of time and at a temperature sufficient to dissolve a substantial part of a lipid fraction in the solvent mixture;
   b) separating the mixture to remove a substantial part of the lipid fraction thereby leaving an enriched lycopene fraction;
   c) rinsing the enriched lycopene fraction with hot acetone to remove the acetone soluble materials thereby leaving, after filtration, a crystalline lycopene fraction;
   d) dispersing the crystalline lycopene fraction so obtained in a food-compatible liquid which dissolve does not substantially dissolve lycopene; and
   e) size-reducing the lycopene crystals in the food-compatible liquid.

27. A process according to claim 26, wherein the food-compatible liquid is selected from the group consisting of glycerol, propylene glycol, ethanol and their mixtures, or mixtures thereof.

28. A process according to claim 27, wherein the liquid is glycerol.

29. A process according to claim 27, wherein size-reduction of the lycopene crystals is effected by wet grinding.

30. A process according to claim 26, wherein the mixture is separated by filtration or centrifugation or decantation, or by a combination of two or more of such methods.

31. A method of coloring a water-based product; which comprises dissolving in the product a coloring-effective amount of a lycopene concentrate of claim 6 alone or together with additives and/or preservatives.

32. A method according to claim 31, wherein the water-based product is a food product or a cosmetic product or a pharmaceutical product.

* * * * *